United States Patent [19]

Mix et al.

[11] Patent Number: 5,201,924
[45] Date of Patent: Apr. 13, 1993

[54] FILLING MAT-IMMOBILIZED-ELECTROLYTE BATTERIES

[75] Inventors: Renard E. Mix, Yorktown; Robert L. Galyen, Jr., Noblesville, both of Ind.

[73] Assignee: General Motors Corporation, Detroit, Mich.

[21] Appl. No.: 753,487

[22] Filed: Sep. 3, 1991

[51] Int. Cl.$^5$ .......................................... H01M 10/44
[52] U.S. Cl. .................................... 29/623.5; 429/52
[58] Field of Search ........................ 29/623.5, 623.1; 429/52, 118

[56] References Cited

U.S. PATENT DOCUMENTS

| | | | |
|---|---|---|---|
| 3,291,644 | 12/1966 | Gray et al. | 429/118 |
| 3,553,020 | 1/1971 | Corbin et al. | 136/6 |
| 3,912,541 | 10/1975 | Britz et al. | 429/118 |
| 4,421,832 | 12/1983 | Uba | 429/118 X |
| 4,743,270 | 5/1988 | McCartney et al. | 29/623.1 |
| 4,765,798 | 8/1988 | Batson et al. | 29/623.5 X |

Primary Examiner—Stephen Kalafut
Attorney, Agent, or Firm—Lawrence B. Plant

[57] ABSTRACT

Filling a mat-immobilized-electrolyte battery with electrolyte by injecting the electrolyte into the battery container beneath a galvanic cell element preplaced therein such that the electrolyte rises upwardly through the element.

10 Claims, 2 Drawing Sheets

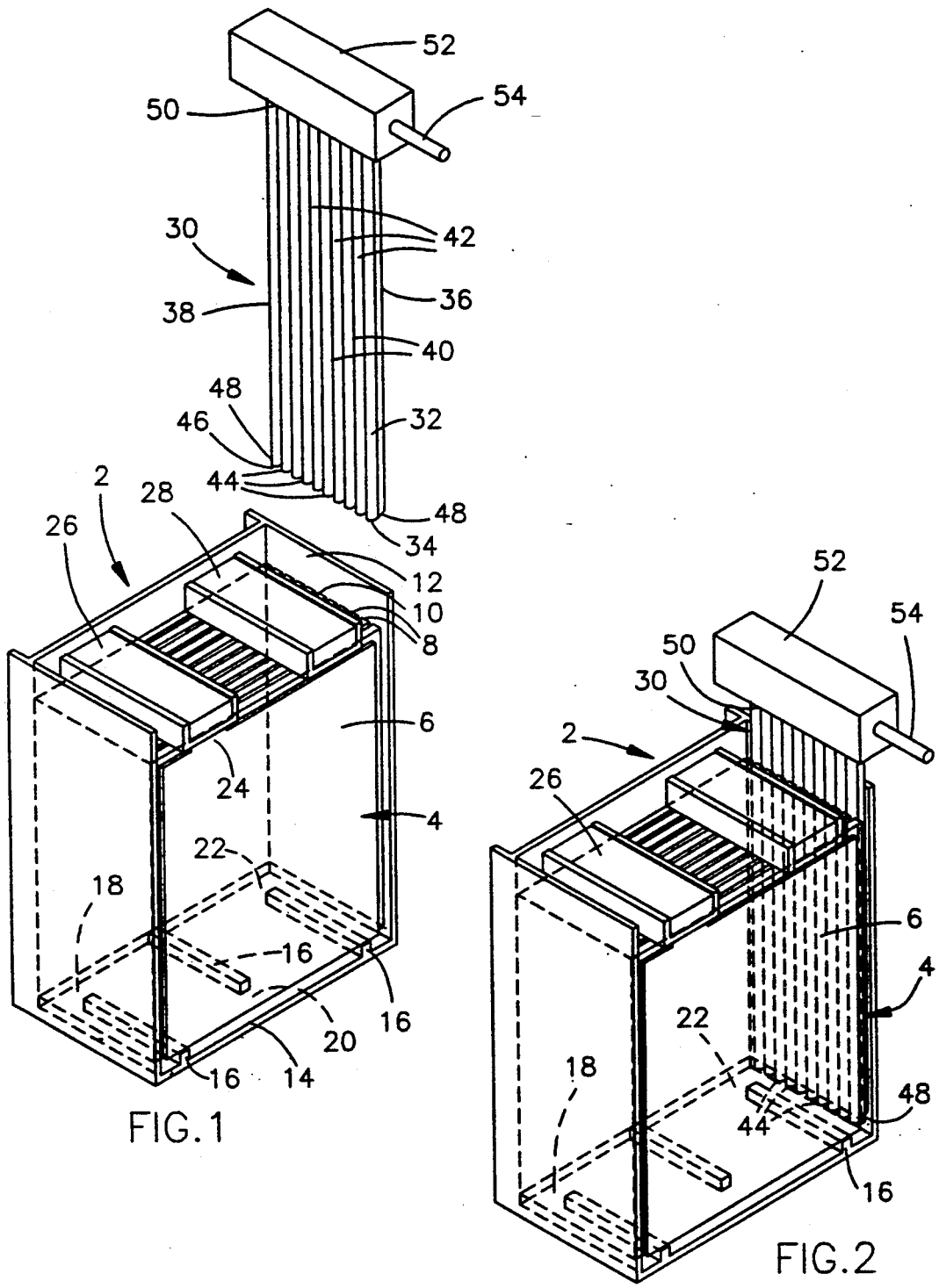

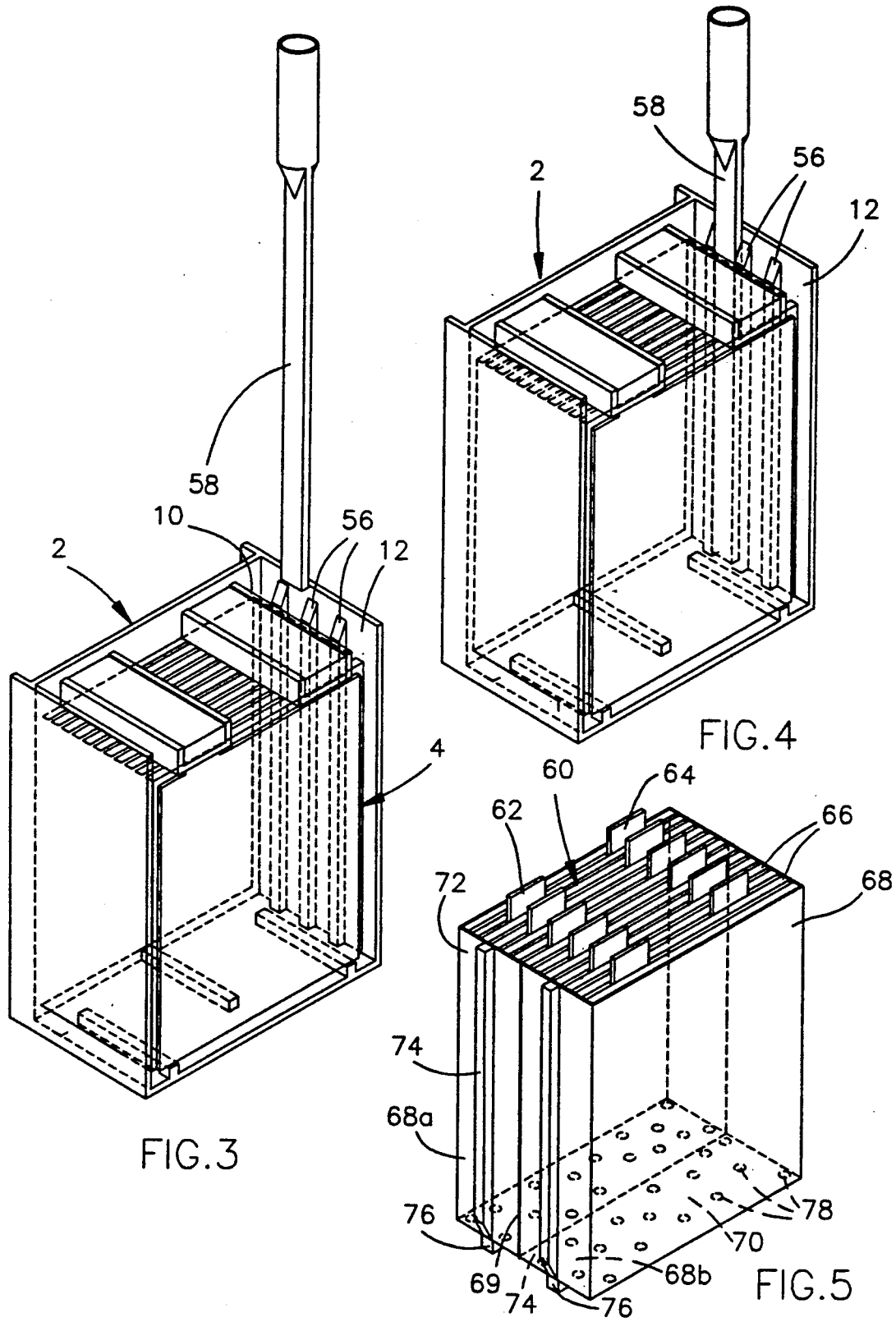

FILLING MAT-IMMOBILIZED-ELECTROLYTE BATTERIES

This invention relates to filling mat-immobilized-electrolyte, Pb-acid electric storage batteries (e.g., gas-recombination batteries) with electrolyte.

BACKGROUND OF THE INVENTION

Mat-immobilized-electrolyte type, Pb-acid batteries include at least one galvanic cell element comprising opposite polarity electrodes (e.g., positive and negative plates) separated one from the other by a porous, absorbent mat (e.g., fibrous polypropylene, Dynel, glass, etc.). The mat is typically compressed between the electrodes and capillarily immobilizes the battery's electrolyte within the cell element. One such battery is described in U.S. Pat. No. 3,553,020 filed Dec. 20, 1968 in the names of Corbin et al and assigned to the assignee of the present invention.

Mat-immobilized-electrolyte batteries may be either of the "flooded" electrolyte type or "starved" electrolyte type. Flooded-electrolyte-type batteries have the mat and electrodes saturated with electrolyte in that the volume of the electrolyte substantially equals or exceeds the void volume of the pores within the mat and the electrodes. Starved-electrolyte-type batteries, on the other hand, have considerably less electrolyte volume than the void volume of the pores within the mat and the electrodes. So-called gas-recombinant batteries, for example, operate in a starved electrolyte condition wherein electrolyte volume is only about 60% to 90% of the available void volume within the mat and electrodes and thereby provide sufficient void space therein to permit migration of oxygen from the positive electrode directly to the negative electrode for consumption thereat.

Conventional (i.e., mat-free) lead-acid storage batteries are commonly manufactured by placing the cell elements in the battery container in the unformed (i.e., uncharged condition) state wherein the positive and negative electrodes both comprise essentially lead oxide. Thereafter $H_2SO_4$ forming acid is metered into the cell compartment atop the elements until the compartment is filled. The electrodes are subsequently electrolytically formed (i.e., initially charged) by passing a forming current therethrough. In some cases, the residual forming acid is then dumped and fresh acid substituted therefor as the working electrolyte. In other instances, the forming acid has sufficient residual strength to remain in the battery as the working electrolyte. Between the time the forming acid is added and the formation process begins, the sulfuric acid reacts exothermically with the lead oxide to form lead sulfate in both the positive and negative electrodes in a process often referred to as "pickling". The initial pickling reaction is quite vigorous and results in the generation of considerable heat and some gas. The initial pickling reaction subsides considerably after about the first several minutes following acid addition as the acid weakens (i.e., becomes more dilute), the electrodes become sulfated and the lead oxide available for reaction decreases.

Electrolytic formation of the battery follows pickling and involves passing forming current through the battery to convert the lead sulfate in the electrodes to lead dioxide in the positive electrodes, lead in the negative electrodes and to reconstitute sulfuric acid in the electrolyte. The electrolytic formation process adds considerable heat to the battery thereby causing the temperature of the elements to increase significantly. High element temperatures during formation causes the gassing overvoltage of the electrodes to drop which in turn undesirably causes excessive gassing. Hence it is desirable to have the element temperature as low as possible at the beginning of formation so that undesirably high temperatures are not reached during formation. In mat-free batteries, the batteries can cool sufficiently by standing for about 30 to 60 minutes following pickling so as not to significantly affect gassing. Batteries containing glass mats however retain the heat for significantly longer periods of time.

In conventional, mat-free batteries excess gassing during formation, while undesirable, can nonetheless be tolerated as the gas can readily escape the element from between the plates. For mat-containing batteries, however, gassing during formation must be kept to a minimum in order to prevent any gas from becoming entrapped within the mat causing so-called "dry spots" therein where little or no acid is present. In this regard, dry spots, whether formed during the pickling or formation reactions, will not only interfere with the formation reaction by causing incomplete formation in some regions of the electrodes and increased current densities in other regions thereof, but ultimately results in undesirable lead treeing (i.e., dendrite growth) between the plates, reduced battery capacity and cold cranking performance, as well as shortened cycle life.

Filling mat-immobilized-electrolyte type batteries with electrolyte by dispensing the electrolyte atop the cell element after the cell elements have been placed in their container can have a detrimental affect on the performance of the battery. In this regard, when so filled, the mats often: make it difficult to obtain uniform distribution of acid throughout the cell element; result in vaporization of the electrolyte within the cell element during pickling; and/or result in mats containing pockets of trapped gases (i.e., dry spots). More specifically, electrolyte introduced into the container atop the cell element percolates down through the cell element from the top thereof, thereby trapping air within the element as well as preventing the ready escape of the gases and heat generated during the pickling reaction. As a result, not only are dry spots prevalent, but the temperature of the element is elevated to an undesirably high level and retains the heat for a prolonged period of time. Moreover, the concentration of the electrolyte within the cell element tends to vary from one location to the next. One reason for this is the stratification that occurs by virtue of the electrolyte front's descending down through the cell element. As the electrolyte front (i.e., the initial few centimeters of the electrolyte wave moving into the element) advances into the element, it is more rapidly depleted of its $H_2SO_4$ content then is the electrolyte tracking behind the front. As a result, by the time the liquid front moves into the center of the element, it has much lower sulfuric acid concentration than the acid tracking behind it. If the wicking rate and starting acid temperature are slow and high (e.g., ambient temperature) respectively, it is possible to end up with a slightly alkaline aqueous solution in the middle of the element. This results in high $Pb++$ solubility due to the high pH and high temperatures. If this solubility is high and remains high even for only several minutes, the soluble lead migrates into the separators where it is converted to lead which electrically bridges (i.e., shorts) adjacent electrodes during formation and/or subsequent charging. This concentration imbalance effects the conductivity of the electrolyte at different locations in the element which in turn affects current density distribution during formation. Another reason for electrolyte concentration variations is the formation of dry spots (i.e., trapped gases) discussed above. Eventually, acid will infiltrate even into the dry spots, at least to some extent, but is quickly consumed by the unformed PbO in the regions of the electrodes adjacent the dry spots resulting in pockets of low concentration acid within the element. Finally, because mat-immobilized electrolyte elements do not take up electrolyte as quickly as mat-free elements, care must be taken to meter the electrolyte into the container atop the element at a sufficiently slow rate as to preclude overflow thereof from the top of the container above the cell element.

McCartney, Jr. et al U.S. Pat. No. 4,743,270 proposes to minimize some of the aforesaid problems by putting the electrolyte into the container first, and then immersing the cell element slowly into the electrolyte. This technique is relatively slow and causes the acid to contact and contaminate the plate lugs and interferes with the subsequent welding of the lugs to the battery's plate straps used to connect the several plate lugs of like polarity.

OBJECT OF THE INVENTION

It is an object of the present invention to provide a unique, simple, quick and effective method of filling mat-immobilized-electrolyte, lead-acid storage batteries with electrolyte so as (1) to substantially avoid the entrapment of air and pickling gases within a cell element during filling, (2) to dissipate the heat generated therein during pickling, and (3) avoid contamination of the plate lugs which interferes with welding of the lugs to the battery's plate straps. This and other objects and advantages of the present invention will become readily apparent from the detailed description thereof which follows and which is given hereafter in conjunction with the several drawings in which:

FIGS. 1 and 2 are isometric views of a battery and filler nozzle therefor in accordance with one embodiment of the present invention before and after insertion of the nozzle in the battery container;

FIGS. 3 and 4 are isometric views of a battery and filler nozzle therefor in accordance with another embodiment of the present invention before and after insertion of the nozzle in the battery container; and FIG. 5 is an isometric view of a battery cell element in accordance with still another embodiment of the present invention.

BRIEF SUMMARY OF THE INVENTION

The present invention comprehends a method of filling a mat-immobilized-electrolyte type, Pb-acid storage battery with electrolyte wherein a predetermined quantity of sulfuric acid sufficient to wet substantially the entire internal surface area of the mats and electrodes is fed into the bottom of a cell container beneath a cell element preplaced in the container. The cell element will have its plate straps welded to the plate lugs before acid-filling commences so that acid contamination of the lugs prior to welding is avoided. Acid is preferably pumped into the bottom of the container, beneath the cell element and then rises up through the cell element displacing air and gases as the front moves upwardly. Under these conditions, any gases generated during the initial pickling reaction, as well as any air in the mat, can freely vent from the element via the pores in the as yet unwetted portions of the mat. Such venting of the gases through the unwetted portion of the mat and displacement thereof upwardly out of the element by the upwardly moving front of the electrolyte virtually eliminates the formation of pockets of gas or dilute electrolyte within the element. Vacuum may be applied at the top of the container to accelerate filling.

Filling mat-immobilized batteries according to the present invention also results in a much cooler cell element at the commencement of formation (i.e., for a given stand time) than similar batteries filled such that the acid percolates down through the element. In this regard, pumping the acid from beneath the element upwardly through the element permits the heat generated by the initial pickling reaction to be readily removed from the cell element primarily by the cooling effect of the electrolyte front as it moves up through the element and carries the heat from the innards of the element to the top thereof where it can be readily dissipated. The relatively high heat capacity of the electrolyte (i.e., about four times that of the electrodes) causes the electrolyte front to act like a heat sink which absorbs the heat from the electrodes as it moves past the reaction zone toward the top of the element. Batteries so filled can cool sufficiently to commence formation in less time than mat-immobilized-electrolyte-type batteries filled from the top.

DETAILED DESCRIPTION OF THE SPECIFIC EMBODIMENT

FIG. 1 depicts a battery container 2 a housing a battery element 4 comprising a plurality of positive electrodes 6 alternately interspaced with a plurality of negative electrodes (not shown), each separated one from the other by a compressible electrolyte-absorbent mat 8 sandwiched between the positive and negative polarity electrodes. The cell element 4 substantially fills the container compartment such that the face 10 of the element 4 lies adjacent wall 12 of the container 2. The bottom wall 14 of the container 2 includes several transverse rib-like bridges 16 for supporting the element 4 above the bottom wall 14. The ribs 16 are discontinuous, e.g., at sites 18, 20 and 22 to permit ready flow of electrolyte entering the container 2 along the wall 12 to flow across the bottom 14 of the container 2. As shown, the ribs 16 lie transverse the direction of electrolyte flow along the bottom, but alternatively could just as well lie parallel to the direction of flow. The several positive electrodes 6 each include plate lugs 24 (only the roots thereof shown) which extend upwardly therefrom and are fused to a positive plate strap 26. The negative plate lugs (not shown) are similarly fused to negative plate strap 28.

After the cell element 6 has been assembled, compressed and inserted into the container 2, an electrolyte injection nozzle 30 is inserted into the container 2 between the element face 10 and container wall 12 (see FIG. 2). The injection nozzle 30 may take a variety of forms suitable to providing a stream of electrolyte at the bottom 14 of the container 2 which is approximately equal to the width of the container 2. The preferred nozzle 30 includes essentially two stainless steel metal sheets welded together to provide a very thin (Ca 0.050") portion which enters the container 2 contiguous the wall 12. The foremost metal sheet 32 shown is corrugated while the underlying sheet 34 is flat. The sheets 32 and 34 are welded together along the edges 36 and 38 as well as in the valleys 40 between the peaks 42 of the corrugations so as to provide a plurality of separate conduits and corresponding outlets 44 for distributing the electrolyte substantially uniformly across the bottom of the container 2. The injector 30 will preferably be tapered from top to bottom so as to provide a very thin leading edge 46 as to facilitate insertion into the region between the element face 10 and container wall 12 and to reduce the possibility of tearing the separators 8 during insertion. Similarly, the corrugations at the leading edge 46 will also be cut back at an angle to further facilitate insertion and reduce tearing the separators 8. The ends 48 on the leading edge 46 are likewise cut back at an angle so as to facilitate alignment and guiding of the injector 30 into the container 2. The upper end 50 of the corrugated portion of the nozzle 30 is sealingly joined to a manifold 52 for simultaneously supplying electrolyte to the several conduits formed by the corrugated sheets. The manifold 52 includes a fitting 54 for connecting to an electrolyte supply hose (not shown). The electrolyte supply hose will in turn be connected to a means for supplying a predetermined volume of acid commensurate with the size of the container 2. This means may be a gravity feeder (i.e., overhead reservoir) or preferably a pump for supplying the acid to the container under moderate pressure.

FIG. 2 is essentially the same as FIG. 1 except that the corrugated portion of the injector 30 is shown in position in the container with the leading edge 46 thereof at substantially the bottom 14 of the container 2. Preferably the injector 30 will be designed such that the peaks 42 of the corrugated sheet will be aligned with battery plates and the mats 8 aligned with the valleys 40 between the peaks to minimize the possibility of tearing the mats 8 during insertion of the injector 30.

FIGS. 3 and 4 depict another embodiment of the present invention wherein the wall 12 of the container 2 includes vertical ribs 56 which space the face 10 of the element 4 from the wall 12. A plurality of injectors 58 (only one shown) are sized to fit down in-between the ribs 46 as best shown in FIG. 4. Several such injectors 54 would be used in each cell compartment and would be connected to a common electrolyte supply manifold (not shown) essentially as described in conjunction with FIGS. 1 and 2.

FIG. 5 depicts still another embodiment of the present invention wherein the cell element 60 includes positive electrodes and associated lugs 62 alternately interspersed between negative electrodes and associated lugs 64 each separated one from the other by electrolyte immobilizing mats 66 and is encased in a sheath or shell 68 which precompresses the cell element 60 before its insertion into the desired container. The shell 68 include two halves 68a and 68b joined together (e.g., heat sealed) along a parting line 69. The shell 68 may comprise a permeable or impermeable plastic or other nonconductive, acid resistant material and may optionally include a bottom wall 70. A plurality of ribs 74 are provided along one side 72 of the shell 68 for spacing the encased cell element 60 from the wall of the container in which it is placed. The bottom wall 70 may be provided with ribs 76 for supporting the encased cell element 60 above the bottom of the container in those cases where the container is not already provided with supporting bridges. The shell 68 need not have a bottom wall 70 but rather simply may be left completely open for the upflow of electrolyte therethrough. However, when bottom wall 70 is provided on the shell 68, it will include a plurality of openings 78 therein to admit acid into the shell for flowing upwardly through the shell 68 from beneath the cell element 60. When a shell-encased element is used within the container it is not necessary that the electrolyte injector extend to the bottom of the container. Rather, it is only necessary that the injection extend sufficiently below the top of the cell element 60 as to insure that electrolyte pumped through the nozzle will flow down the side of the container in the space between the ribs 74. In this regard, there is no need to fully insert the nozzle in the container because the shell 68 (i.e., wall 72) serves to prevent the rush of acid from damaging the edges of the separators 66 while, at the same time, prevents any of the acid from making lateral inroads into the element 60 from the side thereof. In other words, the shell and adjacent container wall serve to direct the electrolyte toward the bottom of the container.

While the invention has been disclosed primarily in terms of specific embodiments thereof it is not intended to be limited thereto but rather only to the extent set forth hereafter in the claims which follows.

The embodiments of the invention in which an exclusive property or privilege is claimed are defined as follows:

1. In a method of assembling a mat-immobilizing-electrolyte Pb-acid storage battery comprising the principle steps of assembling a galvanic cell element containing compressible, absorbent mats sandwiched between positive and negative polarity electrodes, compressing said element so as to compress said mats inserting said compressed element into a container so as to position at least one face of said element in close proximity to a wall of said container, and impregnating said element with sufficient electrolyte to coat substantially the entire internal surface area of said mat and said electrodes, the improvement comprising:
   inserting an injection nozzle into said container for directing said electrolyte into said container between said face and said wall to the underside of said element without first wetting said face with said electrolyte; and
   injecting said electrolyte into said container beneath said element and upwardly into said element so as to displace air and internally generated gases in said element upwardly and out the top of said element.

2. A method according to claim 1 wherein said nozzle extends to substantially the bottom of said container.

3. A method according to claim 1 wherein vacuum is applied to said container during said injecting to accelerate the rate at which said element is impregnated with said electrolyte.

4. A method according to claim 1 wherein a plurality of bridges are provided on the bottom of said container beneath said element to space said element sufficiently above said bottom that said injected electrolyte can be readily distributed substantially uniformly across said bottom.

5. A method according to claim 1 wherein said wall includes a plurality of ribs engaging said face and said nozzle extends into said container between said ribs.

6. A method according to claim 1 wherein said element is wrapped in a sheath and said electrolyte is injected down the side of said container between said sheath and said wall.

7. A method according to claim 6 wherein said sheath is spaced from said wall by at least one rib.

8. A method according to claim 7 wherein said rib is on said sheath.

9. A method according to claim 7 wherein said rib is on said wall.

10. A method according to claim 1 including the step of electrically connecting said positive polarity electrodes together and said negative polarity electrodes together by fusing them to positive and negative plate straps respectively before injecting said electrolyte into said container.

* * * * *